United States Patent [19]

Kendall et al.

[11] Patent Number: 5,782,490
[45] Date of Patent: Jul. 21, 1998

US005782490A

[54] TRACK WHEELED TRAILER

[75] Inventors: Donald H. Kendall; Kenneth W. Kendall, both of Almont, Mich.

[73] Assignee: The United States of America as represented by the Secretary of the Army, Washington, D.C.

[21] Appl. No.: 594,824

[22] Filed: Jan. 11, 1996

[51] Int. Cl.⁶ .................................................. B62D 63/08
[52] U.S. Cl. ........................... 280/789; 280/400; 280/680
[58] Field of Search ........................... 280/400, 47.331, 280/47.131, 678, 680, 683, 685, 686, 688, 713, 718, 724, 725, 28.5

[56] References Cited

U.S. PATENT DOCUMENTS

| 1,857,343 | 5/1932 | Armington et al. | 280/28.5 |
| 1,887,042 | 11/1932 | Rogers | 280/680 |
| 3,901,398 | 8/1975 | Bunch | 280/789 |
| 4,344,643 | 8/1982 | Ray | 280/725 |

FOREIGN PATENT DOCUMENTS 1555601  8/1970  Germany ................. 280/725

*Primary Examiner*—Brian L. Johnson
*Assistant Examiner*—Avraham Lerner
*Attorney, Agent, or Firm*—Peter A. Taucher; David L. Kuhn

[57] ABSTRACT

A flat bed off-road trailer has a rigid planar frame supporting the bed. The frame has transverse members at the forward and rear edges of the bed, and has longitudinal members at lateral edges of the bed. A rigid undercarriage fixed to the trailer's axle is hinged to the frame via journal connections between forward outboard zones of the frame and forward outboard zones of the undercarriage. The trailer has springs for absorbing road shocks, the springs being located between rear outboard zones of the frame and rear outboard zones of the undercarriage. The trailer has a tiltable tractive subassembly which comprises walking beams journalled to the axle, wheels mounted at either end of the walking beams, a band wrapped around the wheels and structure to limit tilting of the subassembly.

7 Claims, 2 Drawing Sheets

TRACK WHEELED TRAILER

GOVERNMENT USE

The invention described here may be made, used and licensed by or for the U.S. Government for governmental purposes without paying us royalty.

BACKGROUND AND SUMMARY

The US Army deploys hundreds of small utility trailers all over the world. Typically these trailers are towed over off-road terrain by tanks, armored personnel carriers, military cargo trucks and other vehicles. The trailers are often specially configured to serve as mobile communication towers, command posts or simply means to carry extra fuel cells. During military operations, it is desired to tow such trailers at relatively high speed from one area to the next in order to support combat activity. However, the speed at which trailers can be towed is limited by their tendency to tip over sideways at high speeds. Consequently, there has always been a limit on the usefulness of such trailers to support combat activities.

We have invented a trailer which has a much reduced tendency to tilt or tip sideways during high speed off-road travel. The trailer includes a rigid planar frame supporting the periphery of the trailer's cargo deck. High speed stability is accomplished by a rigid undercarriage which hinges to the trailer frame at the forward end of the trailer's cargo deck, and which is connected by springs to the frame at the deck's rear. The undercarriage fits between wheel assemblies disposed under the lateral edges of the deck, so that the undercarriage adds no vertical distance between the deck and the ground. Our trailer's design is simple and robust, so that logistical and maintenance cost for a global distribution of such trailers is minimized.

DETAILED DESCRIPTION

Figure 1:
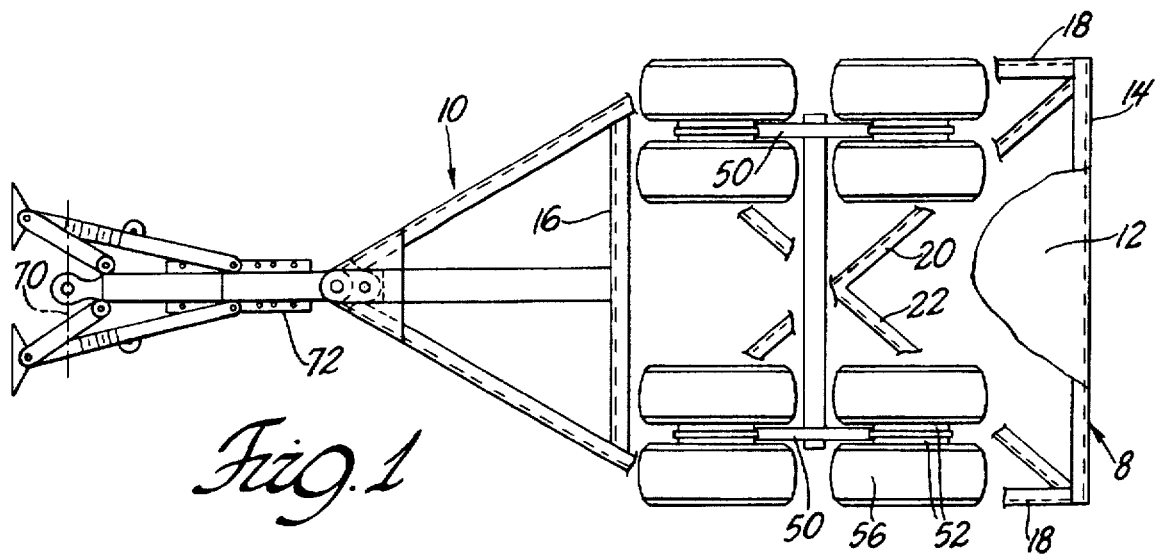
FIG. 1 is plan elevational view of a utility trailer having most of the cargo deck cut away to reveal the underlying frame elements. The undercarriage elements are removed in this Figure.

FIG. 1 shows a partially cut away plan view of trailer 10 minus the undercarriage structure, wherein a cargo deck 12 is fixed upon a rigid, generally planar frame 8. Frame 8 has transverse frame members 14 and 16, longitudinal frame members 18, and intersected diagonal frame members 20 and 22. These frame members are typically made from common angle iron or angle steel stock. The frame can be seen in complete form in FIG. 2, as can undercarriage 24, which supports frame 8.

Figure 2:
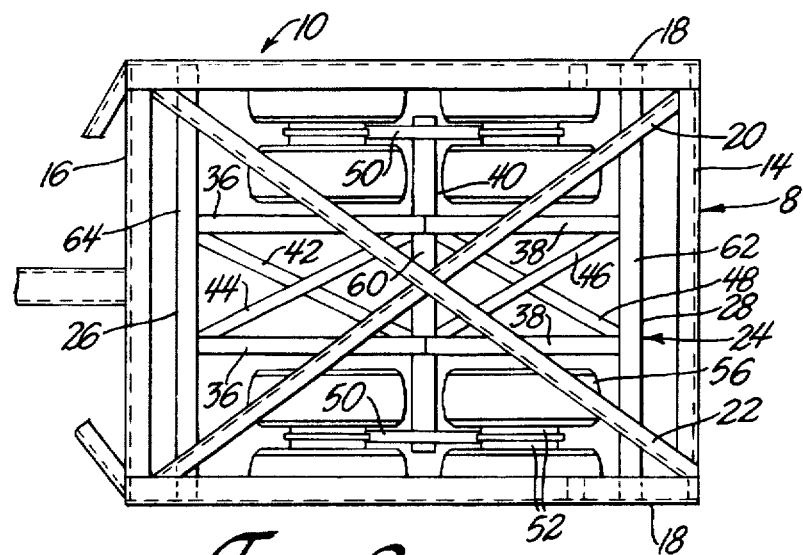
FIG. 2 is a plan elevational view of the trailer minus the cargo deck but showing all the trailer's frame members, all undercarriage members, and the wheel assemblies.
Figure 3:
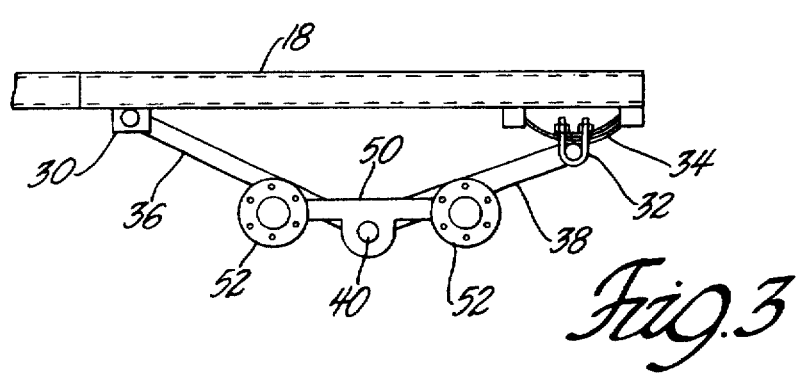
FIG. 3 is a side elevational view of the undercarriage and a walking beam of the trailer.
Figure 4:
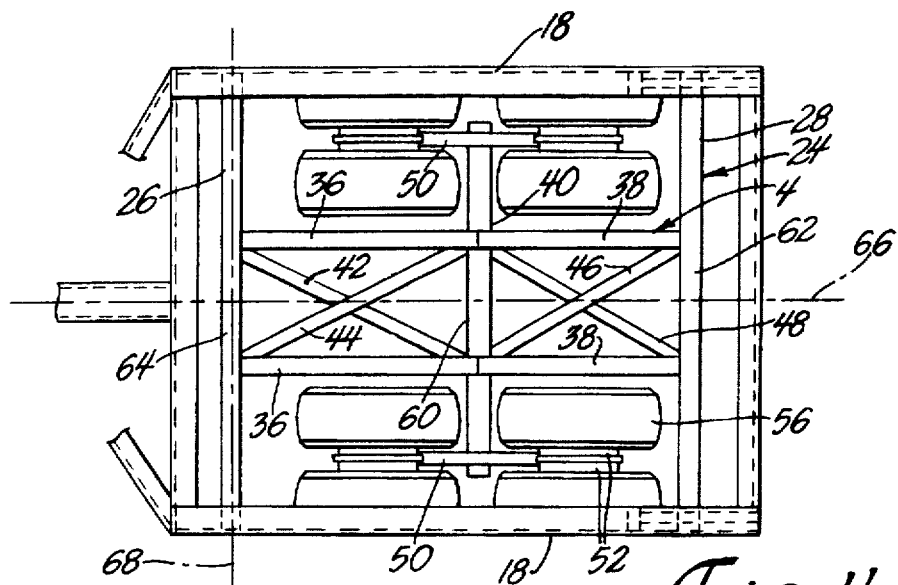
FIG. 4 is a plan elevational view of the trailer, wherein the cargo deck and part of the frame are removed to better show the undercarriage, walking beams and tires of the trailer.

As seen in FIGS. 2, 3 and 4, undercarriage 24 has transverse beams or rods 26 and 28 extending outboard of trailer 10 as far as the outboard edges of frame members 18. Transverse rod 26 journals closely in blocks 30 (FIG. 3) fixed to longitudinal frame members 18 at the fore ends thereof. It is desired that the journal connection between rod 26 and frame 8 be as far outboard as possible for two reasons: first, to minimize side-to-side tipping of frame 8 relative to undercarriage 24 and, second, to optimize the stiffening of frame 8 by undercarriage 24. Another transverse rod, at 28, is connected by U-bolts 32 to leaf springs 34, which are attached to the aft ends of frame members 18. Optionally, conventional shock absorbers may supplement or replace springs 34.

Figure 5:
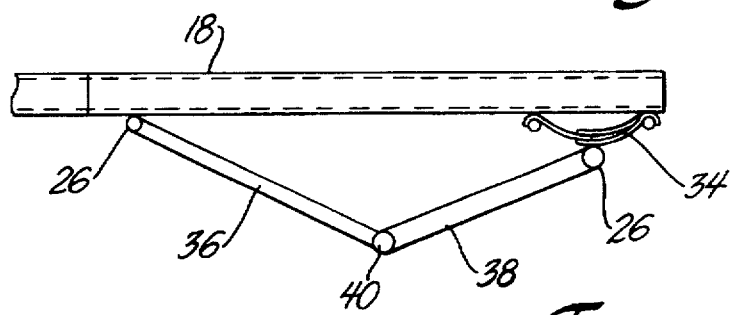
FIG. 5 is a side elevational view of the undercarriage and its connection to the trailer's axle.

Fixed to central zone 64 of transverse rod 26, and extending down and aft therefrom are a pair of parallel fore arms 36. Similarly fixed to central zone 62 of traverse rod 28, and extending downward and forward therefrom are a pair of parallel aft arms 38 that are preferably approximately as long as arms 36. Fore arms 36 and aft arms 38 form a solid junction with central zone 60 of axle 40, as seen in FIGS. 4 and 5, whereby axle 40 reinforces undercarriage 24. Intersected cross ties 42 and 44 brace the various connections among arms 36, transverse rod 26 and axle 40. In similar fashion, intersected cross ties 46 and 48 brace various connections among arms 38, transverse rod 28 and axle 40. For convenience, the generally V-shaped assembly comprised of the fore arms, aft arms, cross ties and central zones may be referred to as the trailer's subcarriage 4 (FIG. 4). The subcarriage is an extremely rigid structure that transfers upward force at either end of axle 40 to the ends of transverse rods 26 and 28 and thence to frame 8. As a consequence, frame 8 does not tilt about its longitudinal, or fore-to-aft, axis 66; rather, frame 8 will tilt only about axis 68 (FIG. 4) of transverse rod 26.

Figure 6:
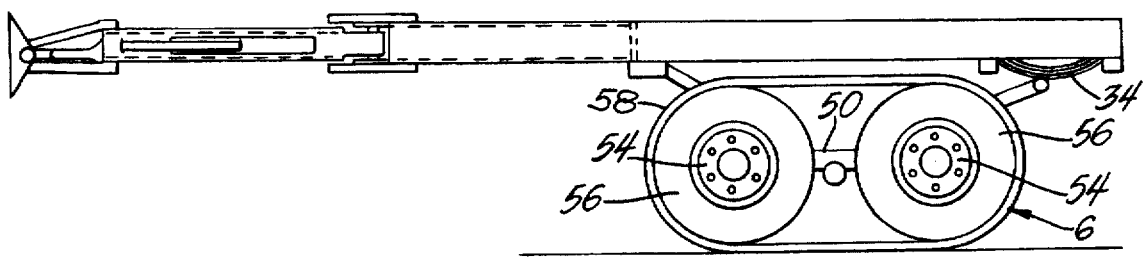
FIG. 6 is a side elevational view of the trailer shown in FIG. 1.

Referring now to FIGS. 2 and 3, there is journalled to either end of axle 40 a walking beam 50, the walking beams tilting independently of one another relative to axle 40. Two pairs of wheel hubs 52 are rotatably mounted to each walking beam, one pair mounted at the aft end of the walking beam and the other pair mounted at the fore end. Wheels 54 (FIG. 6) are bolted to hubs 52 and tires 56 are mounted on wheels 54. A flexible band or track 58 wraps around all the wheels associated with a given walking beam as illustrated in FIG. 6. The assembly comprised of a walking beam 50, wheel hubs 52, wheels 54 and a band 58 may be for convenience be regarded as a tractive subassembly 6 (FIG. 6). The tractive subassembly tilts as a unit about the axis of axle 40, and preferably no part of the tractive subassembly is disposed further outboard of trailer 10 than deck 12 or longitudinal frame members 20 and 22.

Note that longitudinal frame member 18 lies directly above the outboard portion of tractive subassembly 6 so that member 18, and thus frame 8 as a whole, will interfere with the tractive subassembly's tilt once the tilt reaches a predetermined angle. The tractive subassembly tilts freely up to the predetermined angle and thereafter frame 8 inhibits, but does not entirely prevent, the tilt of this subassembly. Optionally, a conventional mechanical stop can be installed on the assembly to limit its angular motion about axle 40. Note, too, that subcarriage 4 occupies less than half, and typically only about one-third, of the width of the trailer so that the subcarriage can fit between the two tractive subassemblies 6. Consequently, the vertical height of the trailer is reduced without sacrificing ground clearance.

Axis 68 may be regarded as the hinge axis between frame 8 and undercarriage 24 and it is preferred that axis 68 be at the front of cargo deck 12 as opposed to the deck's rear. It is also preferred that transverse rod 28 and springs 34 be at the deck's rear. By this arrangement, upward forces transferred through undercarriage 24 to frame 8 act on the rear of trailer 10. Consequently, trailer 10 will swing about a horizontal axis, such as axis 70, at the fore end of trailer tongue 72, where trailer 10 connects to a tractor vehicle (not shown). As a result of trailer 10 swinging about axis 70, The connection between trailer 10 and the tractor vehicle will avoid potentially damaging loads from the upward forces. Such loads would be avoided less, for example, if axis 68 were at the rear of the trailer and springs 34 were at the fore end of frame 8.

We wish it to be understood that we do not desire to be limited to the exact details of construction or method shown herein since obvious modifications will occur to those skilled in the relevant arts without departing from the spirit and scope of the following claims.

What is claimed is:

1. A utility trailer adapted for off-road travel, comprising:
   a cargo deck;
   a rigid frame supporting the cargo deck;
   a first transverse member of the frame at a forward edge of the cargo deck;
   a second transverse member of the frame at a rear edge of the cargo deck;
   longitudinal members of the frame at lateral edges of the cargo deck, the longitudinal members fixed between the first and second transverse members;
   an axle;
   a rigid undercarriage fixed to the axle;
   wherein the undercarriage includes a generally V-shaped structure comprising a pair of fore arms extending down and aft from a central zone of the first transverse member, a pair of aft arms extending down and forward from a central zone of the second transverse member and solid connection between lowers ends of the arms and a central zone of the axle;
   hinge connections between forward outboard zones of the frame and forward outboard zones of the undercarriage;
   a hinge axis of the hinge connections, the hinge axis disposed horizontally transversely of the trailer;
   means for absorbing road shocks, the absorbing means located solely between rear outboard zones of the frame and rear outboard zones of the undercarriage.

2. The trailer of claim 1 wherein the undercarriage is less than half as wide as the frame.

3. The trailer of claim 1 wherein the undercarriage is disposed directly below the frame and between the wheels.

4. The trailer of claim 1 including a tiltable tractive subassembly, which comprises:
   walking beams journalled to the axle;
   at least one wheel mounted at either end of the walking beams;
   a band wrapped around the wheels;
   means to limit free tilting of the tractive subassembly relative to the trailer.

5. A utility trailer adapted for off-road travel, comprising:
   a rigid frame;
   a first transverse member of the frame;
   a second transverse member of the frame;
   longitudinal members of the frame fixed to the first and second transverse members;
   an axle;
   a rigid undercarriage fixed to the axle;
   wherein the undercarriage has a generally V-shaped structure comprising a pair of fore arms extending down and aft from a central zone of the first transverse member, a pair of aft arms extending down and forward from a central zone of the second transverse member and a connection between lower ends of the arms and a central zone of the axle.
   hinge connections between the frame and the undercarriage;
   a hinge axis of the hinge connections, the hinge axis disposed horizontally transversely of the trailer;
   means for absorbing road shocks, the absorbing means located solely between rear outboard zones of the frame and rear outboard zones of the undercarriage.

6. The trailer of claim 5 wherein the undercarriage is less than half as wide as the frame.

7. trailer of claim 5 wherein the undercarriage is disposed directly below the frame and between the wheels.

\* \* \* \* \*